(12) United States Patent
Shuster

(10) Patent No.: US 12,204,984 B2
(45) Date of Patent: Jan. 21, 2025

(54) METHOD AND APPARATUS FOR USING A SEQUENTIAL QR CODE TO VALIDATE A SCANNED QR CODE

(71) Applicant: ACTV8, INC., Chatsworth, CA (US)

(72) Inventor: Brian Shuster, Los Angeles, CA (US)

(73) Assignee: ACTV8, INC., Houston, TX (US)

( * ) Notice: Subject to any disclaimer, the term of this patent is extended or adjusted under 35 U.S.C. 154(b) by 0 days.

(21) Appl. No.: 18/531,509

(22) Filed: Dec. 6, 2023

(65) Prior Publication Data

US 2024/0185013 A1 Jun. 6, 2024

Related U.S. Application Data

(60) Provisional application No. 63/386,257, filed on Dec. 6, 2022.

(51) Int. Cl.
*G06K 7/14* (2006.01)
(52) U.S. Cl.
CPC .................. *G06K 7/1417* (2013.01)

(58) Field of Classification Search
CPC ............... G06K 7/1413; G06K 7/1417; G06K 19/06037
See application file for complete search history.

(56) References Cited

U.S. PATENT DOCUMENTS

| | | | |
|---|---|---|---|
| 2012/0223131 A1* | 9/2012 | Lim | G06F 16/9554 235/375 |
| 2022/0180078 A1* | 6/2022 | Duncan | G16H 10/60 |

* cited by examiner

*Primary Examiner* — Laura A Gudorf
(74) *Attorney, Agent, or Firm* — Womble Bond Dickinson (US) LLP

(57) ABSTRACT

A system method for delivery of predetermined administrator user content triggered after scanning a sequential QR code with a device. A UUID generated and is retrieved from the device based on a request received from the device. A trigger ID is obtained from the device based on the request received from the device. A previously created trigger configuration is fetched which trigger configuration provides a delivery setting. Content is then selectively delivered based on target matches with the fetched trigger configuration. The delivered content is the predetermined user content only if the retrieved UUID matches a previously stored UUID for the device.

5 Claims, 4 Drawing Sheets

METHOD AND APPARATUS FOR USING A SEQUENTIAL QR CODE TO VALIDATE A SCANNED QR CODE

BACKGROUND OF THE INVENTION

Barcodes and QR (Quick Response) codes are computer readable images for storing information which can be scanned by a scanning device and converted by a computer into data readable by a human. A barcode is scanned in one direction, while a QR code can be thought of a two-dimensional barcode. QR codes can include more information than barcodes and for this reason can be used in many situations where a barcode cannot be used due to the limited amount of data which can be included in a barcode.

Like barcodes, QR codes can be scanned using special purpose scanners or by the camera in a smartphone which can both detect and scan a QR code. QR codes are generated using a QR code generator as is well known in the art.

Applications for QR codes are almost unlimited, but are frequently used in advertising, business, health care, and education. QR codes can be found in brochures, flyers, posters, billboards, product packaging, business cards, and websites such as social media and shopping sites.

There are two types of QR codes: static and dynamic.

Static QR codes are QR codes that are permanently encoded with information that does not change. This type of QR code is static meaning the data encoded within the QR code will always produce the same result when scanned. Static QR code uses include email addresses, URLs, text, and WiFi passwords. That is, it is a single purpose QR code. The amount of data that can be encoded is limited. If too much data is encoded, scanning it will be less reliable since as the amount of data to be encoded increases, the denser the resulting QR code. As density increases, the more difficult it becomes to be properly scanned. Since the encoded data is the same as the data desired to be presented to a user, it can be used at any time in any location without access to any network.

As shown in FIG. 1, upon scanning a QR code (typically, using a camera built into a mobile device such as a cell phone), the decoded value may be a URL used to open a website. Each time the QR code is scanned, the same URL is used to open the same web page. Instead of a URL, the decoded value could launch a native app on the mobile device, but again, a subsequent scan will launch the same native app. However, when the QR codes decodes a URL, the only information provided to a website accessed by the decoded URL is the address of device which made the request and possibly information about the browser on the device so that the delivered content can be properly rendered on the device.

Dynamic QR codes are QR codes that store a short URL. When scanned, the linked data associated with the URL is retrieved and whatever action is desired when the link is selected will take place. That is, just as a link on a web page, when selected within a web browser, will produce some action, similarly, the link associated with the URL encoded by the QR code will be activated and any information at that link is transmitted to the device that sent the request after the QR code was scanned. For this reason, when a device scans a dynamic QR code, it must be connected to a network which can access the link associated with the URL obtained by scanning the QR code.

Since a dynamic QR code when scanned links to its embedded URL, it is a simple matter to set up that URL so that it redirects to another URL as a function of additional information provided by the device accessing the URL. The additional information can be the browser being used by the device, the device operating system, the device type, e.g., mobile phone or tablet. The redirected URL can then be set up to provide data in the best form for that device type and browser. Although dynamic QR codes provide more flexibility than static QR codes, they cannot be used to tailor to content to specific end user devices. Additionally, like a static QR code, the only information provided to a website accessed by the decoded URL is the IP address of the device which made the request and possibly additional device metadata such as manufacturer, model, screen size, locale, etc., and the operating system and the browser so that the delivered content can be properly rendered on the device.

Thus, static QR codes and dynamic QR codes are similar in that the embedded value is a static value such as a URL. For example, an admin creates a QR code with a value of a URL "http://www.example 1.com/abcdef". Any end-user device that scans the code will be sent to that web address. However, in the case of a static QR code, the end-user will ALWAYS land on the http://www.example 1.com/abcdef website. In the case of the dynamic QR code, an admin can setup a redirection at a later time to another website such as "http://www.example 2.com". In this case, any end-user that scans the dynamic QR code will first land at the "http://www.example 1.com/abcdef" site and then be redirected to http://www.example 2.com.

One problem with present implementations of QR codes, in particular those that are printed on physical media (billboards, magazines, flyers, coupon booklets, etc.), whether static or dynamic, is that the user has no way of knowing for certain whether or not a URL which a QR code is linked to the intended URL. That is, since a QR code cannot be decoded when viewed by a user, if, for example, a QR code presented inside a bank so that the bank customers can easily access the bank's website, can easily be covered over with a fake QR code which directs a customer who scans the fake QR code to a website that appears to be the bank's website, but which exists to obtain the customer's login credentials for possible future unauthorized access. In another situation, at a point of sale location in a retail store, a QR code could be presented for customers to access to obtain a coupon, discount or the like by scanning the QR code. However, if the genuine QR code is covered with a fake QR code, a customer could be redirected to a fake website and tricked into to providing information intended for the genuine website. For example, a customer can be tricked to entering their login credentials for a loyalty program and be vulnerable to fraudulent actions. These are provided as examples of instances where, due to the ease with which QR codes can be covered with fake QR codes, a mechanism is needed to enable inexpensive, fast and easy detection of such fake QR codes.

In the prior art, QR codes can be provided with security mechanisms which can be read using special scanners. However, there are costs associated with such special scanners, especially since there may be a need for multiple scanners for use by different individuals, especially in, for example, a large retail store which uses QR codes throughout the store.

The invention overcomes these limitation as described below.

SUMMARY OF THE INVENTION

The invention uses what can be referred as a sequential QR code or SQR code. Each time a SQR code is scanned (using a camera built into a mobile device such as a cell phone), a different user experience is obtained based on the sequential configuration and targeting settings. Although the SQR code is configured as a static QR code, its implementation as a SQR code enables many if not all of the advantages of a dynamic QR code. Although the data encoded in a SQR code is a URL, and, therefore, always links to the same webpage, additional data provided by the device used to scan the SQR code enables additional actions to be taken.

Unlike the prior art, in the case of the SQR (sequential QR) code, upon scanning, the end-user device will land on the http://www.example1.com/abcdef as in the prior art. However, a web app (website) or native app acting as an API client presents a custom experience to the end-user based on targeting settings configured by an admin. This means, it is a static QR code that produces dynamic content based on the uniqueness of the user (device UUID) accessing it and other information provided in addition to a URL and information about the browser on the device.

As it relates to security, the invention provides a mechanism whereby the device intended for administrative access by an administrative user (admin user) can be setup in advance so that when the QR code is scanned, although the administrative user is directed to the same URL as a non-administrative user, the administrative user is re-directed to a dedicated URL where the QR code can be authenticated by the administrative user.

DETAILED DESCRIPTION OF THE INVENTION

Figure 1:
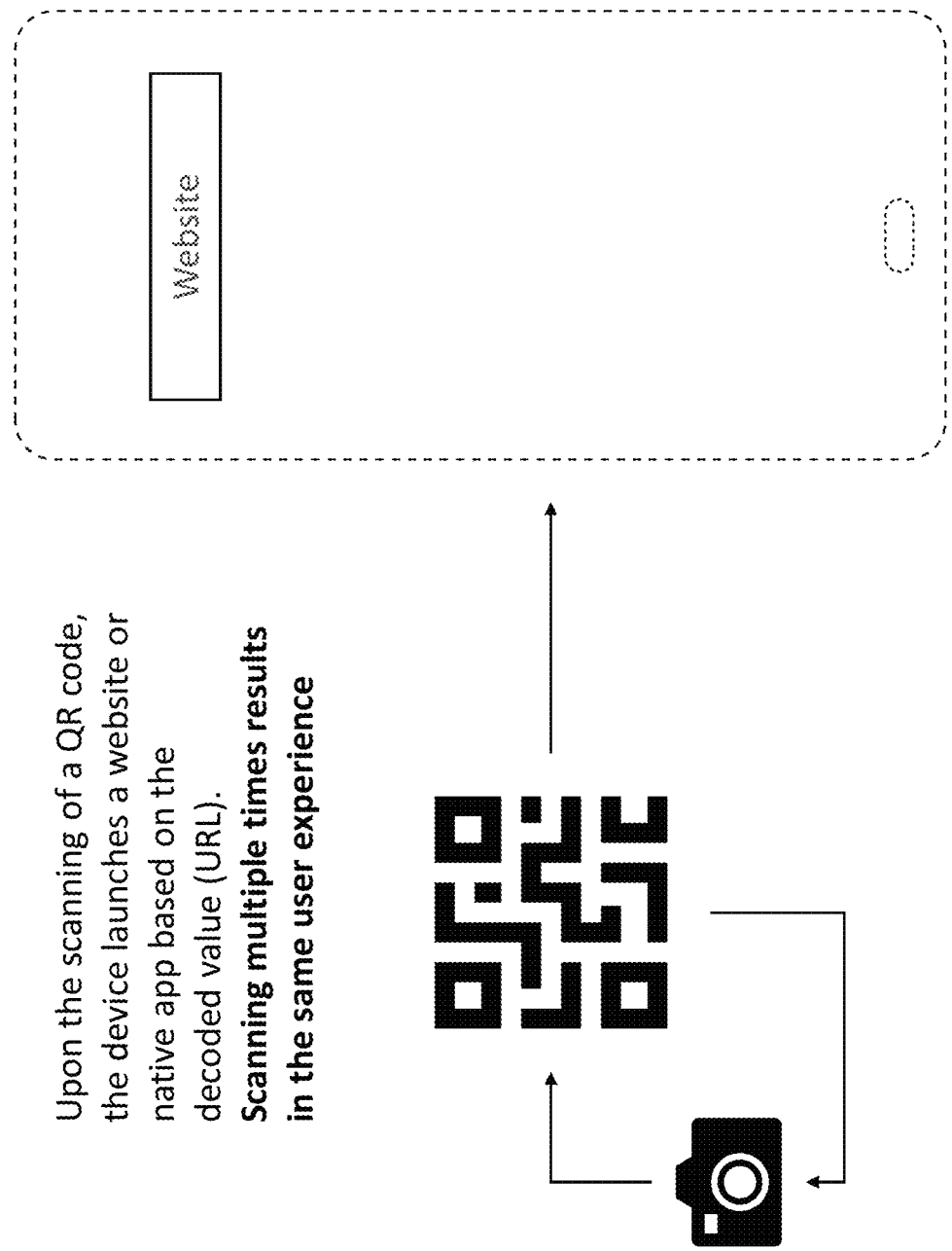
FIG. 1 is shows how a prior art QR code is used.
Figure 2:
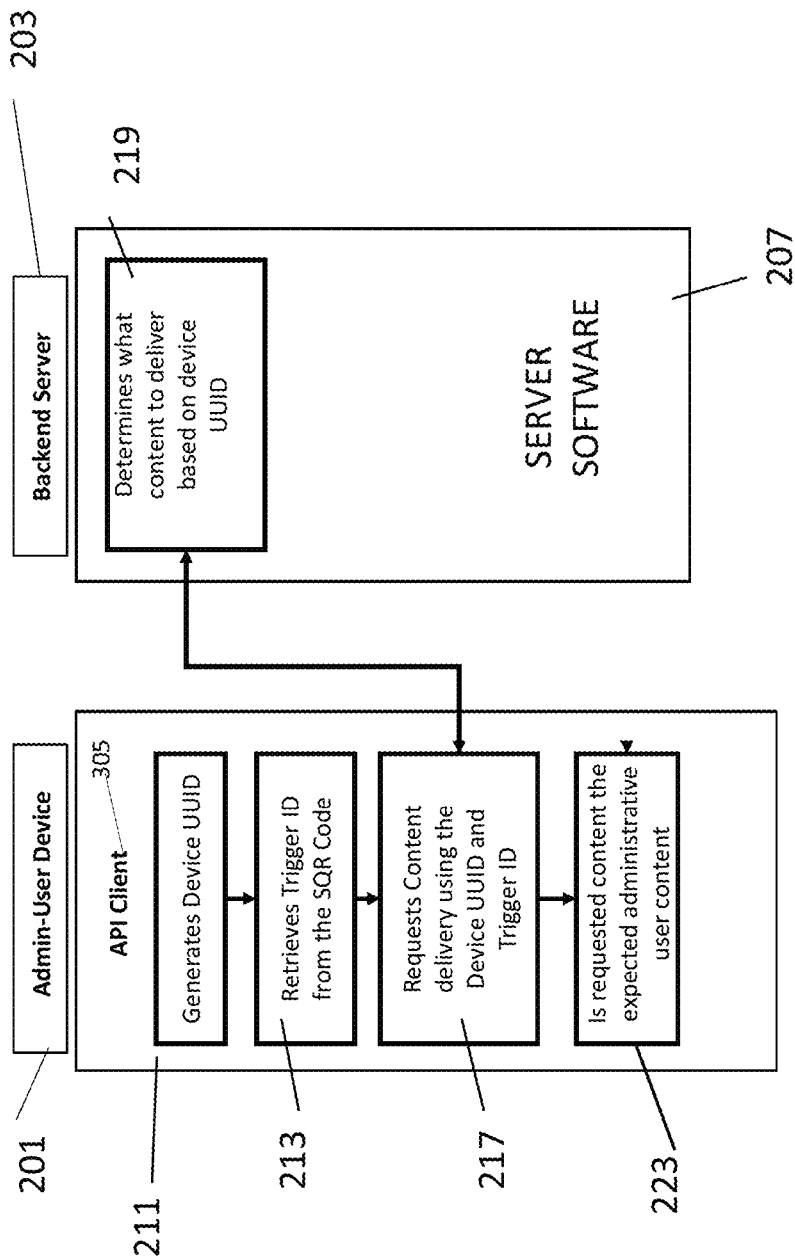
FIG. 2 is an overview block diagram showing the process flow when an SQR code is scanned.

FIG. 2 shows the main functional blocks of the process flow enabling an admin user to authenticate a scanned QR code. An admin user device 201 communicates with a backend server 203 running server software 207 which controls the server operation and accesses a database on the server which maintains all relevant information, including the information pertaining to the authentication of the administrative user device. Of course, the database can consist of multiple files which store information, the specifics of which are well known in the art and not needed for a proper understanding of the invention. The admin user device which could also be an end user device such as a mobile phone has an API client 205 which may be a native app or web application which generates 211 a UUID for the device where the API client is hosted. In either case, that is, whether an API running on the client device or an API running in conjunction with a web application, the flow as shown in FIG. 2 is essentially the same. The UUID is a unique device ID generated by the API client based on parameters obtained from the browser and http request made by the device. The parameters obtained from the browser and http request are, by way of example, as follows: operating system, device model, device locale, IP address, approximate geolocation, screen size. In general, the parameters are made available by the operating system to the native app (including web browsers); they are not used for user identification. This device UUID gets stored in local storage (i.e., cookies, session variables, etc.) for subsequent access. Also provided is a trigger UUID which is a unique identifier for the trigger in the backend server.

The API client retrieves 213 the trigger ID (unique identifier value for the trigger) from the value decoded from the SQR Code. The identifier value decoded from the SQR code is usually just a URL. However, other possibilities include an app which can be accessed and executed on the device. The decoded value of the QR Code may be a "deep link", which is a link that is used to launch an -in-app experience (non-web based). In either case, the API client is always a native app (including web browsers) that interacts with the back end server to request content on behalf of an end-user or administrative user.

The API client requests 217 content from the backend server 203 using the trigger ID and device UUID as part of the request sent to the backend server. The content is simply content which exists on the backend server intended to be provided when requested by a client. If the client is an end user device, such content may include redeemable offers, calendar reminders, quizzes, messages, URL redirects, prizes. However, when the backend server determines 219 from the provided UUID that the client is an admin user device, content only intended for administrative users is provided from which the admin user is able to verify that the scanned QR code is genuine. If the admin user is not provided with the expected admin user content, the admin user can remove the QR code asset and take other appropriate action.

If the content 223 is as expected by the admin user, then the admin user need not take any further action. The admin user should check the validity of the QR code on a periodic basis, the timing of which would depend on the particulars of the environment. For example, if the QR code is located in a bank at a location which cannot be easily monitored, the frequency of such check should be more frequent than in cases where security considerations are less important and/or the likelihood of the QR code being tampered with is low. For example, SQR codes displayed on digital screens are less susceptible to being tampered with, however, the risk still exists for a bad actor to break into an unsecure network at a retail location and replace a legitimate QR code with a fake one.

The backend server uses the provided trigger ID and UUID to retrieve the trigger configuration, including the content sequence, and based on targeting and sequence parameters determines 219 which content item to send back to the API client. The content sequence normally includes an offer associated with the content such as a discount on the price of an item from a retail brand and also includes the redemption information and terms of use as explained in detail in co-pending application Ser. No. 17/576,053. Other types of content can include registration forms to sweepstakes, redirection to other websites, video content, etc. The targeting parameters include time of day, location, device OS or any other parameter which is desired to be considered relevant to each offer.

The manner in which the API client renders the content view depends on the specifics of the content. The specific details of how the content is presented are not important to an understanding of the invention, and are generally well known in the art.

Figure 3:
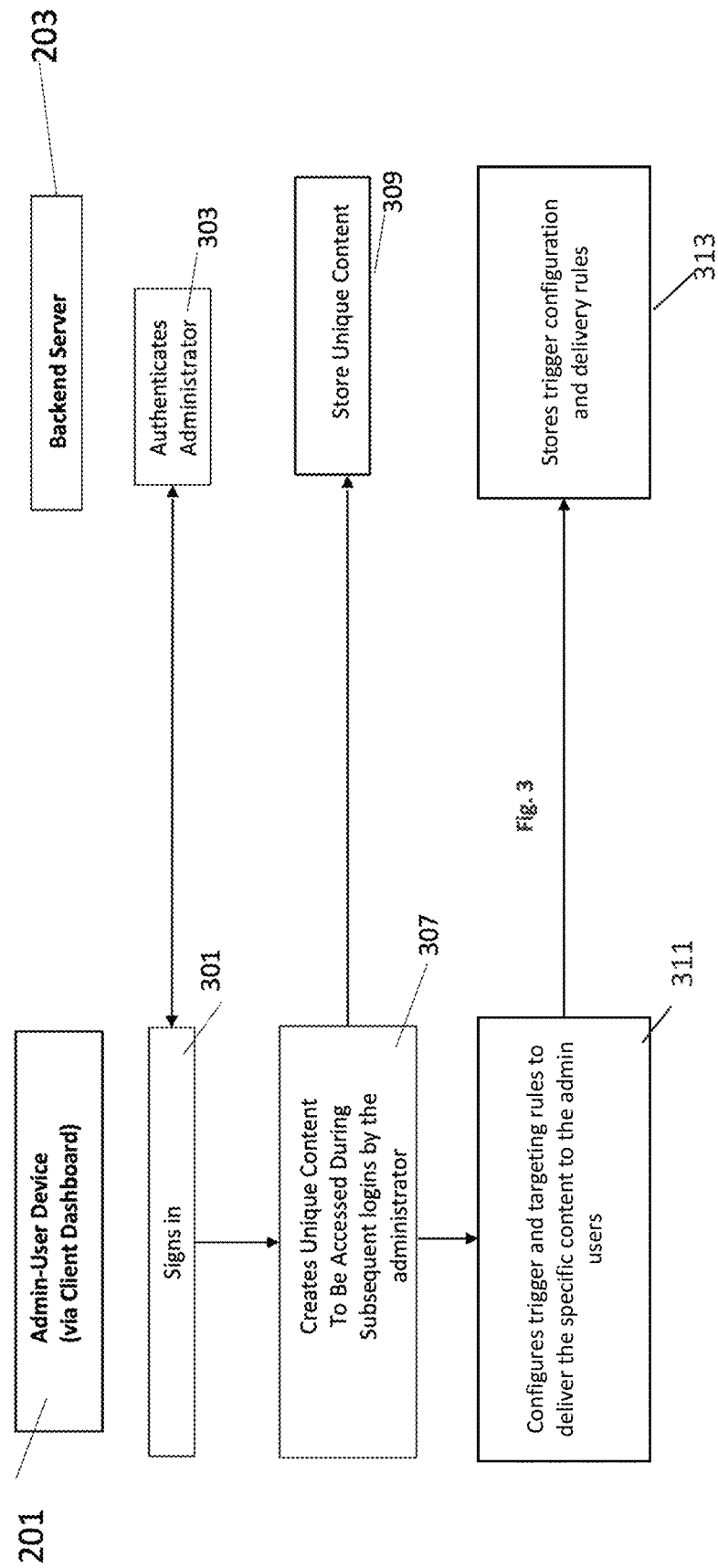
FIG. 3 is a block diagram showing the process flow when an admin user creates unique content to be subsequently provided when an SQR code is scanned by the admin user.

FIG. 3 highlights the main functional blocks of the process flow for the setting up of the admin user and content that the admin user can use to verify that the scanned QR code is genuine.

The backend server 203 authenticates 303 the user using the provided credentials as an admin user and stores the UUID (or UUIDs in case of multiple devices) for the device used by the admin user so that the next time content is requested by the admin user device, the backend server knows that the content to be provided is the content set up by the admin user for verifying that a scanned QR code is genuine. That is, the admin user after being set up as an admin user with a user ID and password or other security measure, initiates a sign-on process on the admin user device, which is used by the back-end server to authenticate 303 the admin user.

The admin user then creates 307 the unique content which can simply be a message which states authentic QR code detected. The unique content is stored 309 on the backend server for subsequent retrieval as explained with reference to FIG. 2. The admin user then configures 311 trigger and targeting rules to deliver the specific content to admin users which are then stored 313 by the backend server.

Trigger Details:
    Trigger Type: Sequential QR Code (SQR)
    Precise Location: FALSE (use approximate location)
Delivery Settings:
    Content Redelivery: Enabled
    Group 1:
        Schedule: Every day
        Target:
            Region: California
            Operating System: Android, IOS
        Content:
            Content #1
            Content #2

Although not shown, backend server 203 also saves the SQR trigger and its configuration. The SQR trigger and its configuration are stored so that they can be easily retrieved when a request is received from a user device after scanning an SQR code which causes the trigger to be sent to the backend server for handling when the trigger is received.

For other than the admin user, the API client (or web app) retrieves the UUID and trigger ID from the value decoded from the scanner SQR code and the flow continues as explained above. That is, content is provided by the backend server to the API client which processes the content as explained in co-pending U.S. application Ser. No. 17/576, 053. For the admin user, the admin user uses the device UUID to setup a trigger and whitelist this UUID as part of the target settings. This makes it possible to deliver content only intended for the admin user. The UUID is generated by the API client via a background process running in the background on the native app (including web browser) which retrieves the device parameters made available by the operating system (including OS name, OS version, device model, locale, as well machine learning to generate a value (hash code) that can uniquely identify a device with a 99.5% accuracy. The generated UUID for all practical purposes is unique in that it is randomly generated from a large enough set of possibilities as to make it effectively unique even though a duplicate is theoretically possible. Since the API client generates the UUID, its use and uniqueness only applies to processes accessed by the API client. At this time, depending on the user granting permission to access GPS data, the precise location of the device is also sent using the latitude/longitude values provided by the GPS of the device where the API client is installed. Alternatively, an approximate location is retrieved from the IP address of the request by performing a geoip lookup. The location is also stored as part of the device record. That is, at the time of scanning the SQR code, the backend server is also provided with the location of the device which can be used to determine the content to be delivered. This is another way in which the same SQR code can provide different results based on location. The accuracy of the content delivery based on location depends on the precision of the location information obtained. The backend server also takes into account the date and time when the request is made and uses them as factors when determining what content to deliver as a response. The date and time is determined by the server at the time of the request by creating a timestamp in UTC (Universal Time Coordinated) format which is also stored as part of the device record. Although not necessary, by also providing location data, an admin user can use the same device from multiple locations and obtain location specific content if necessary. In this manner, an admin user can check for genuine QR codes at multiple locations, each providing a location specific confirmation/

Figure 4:
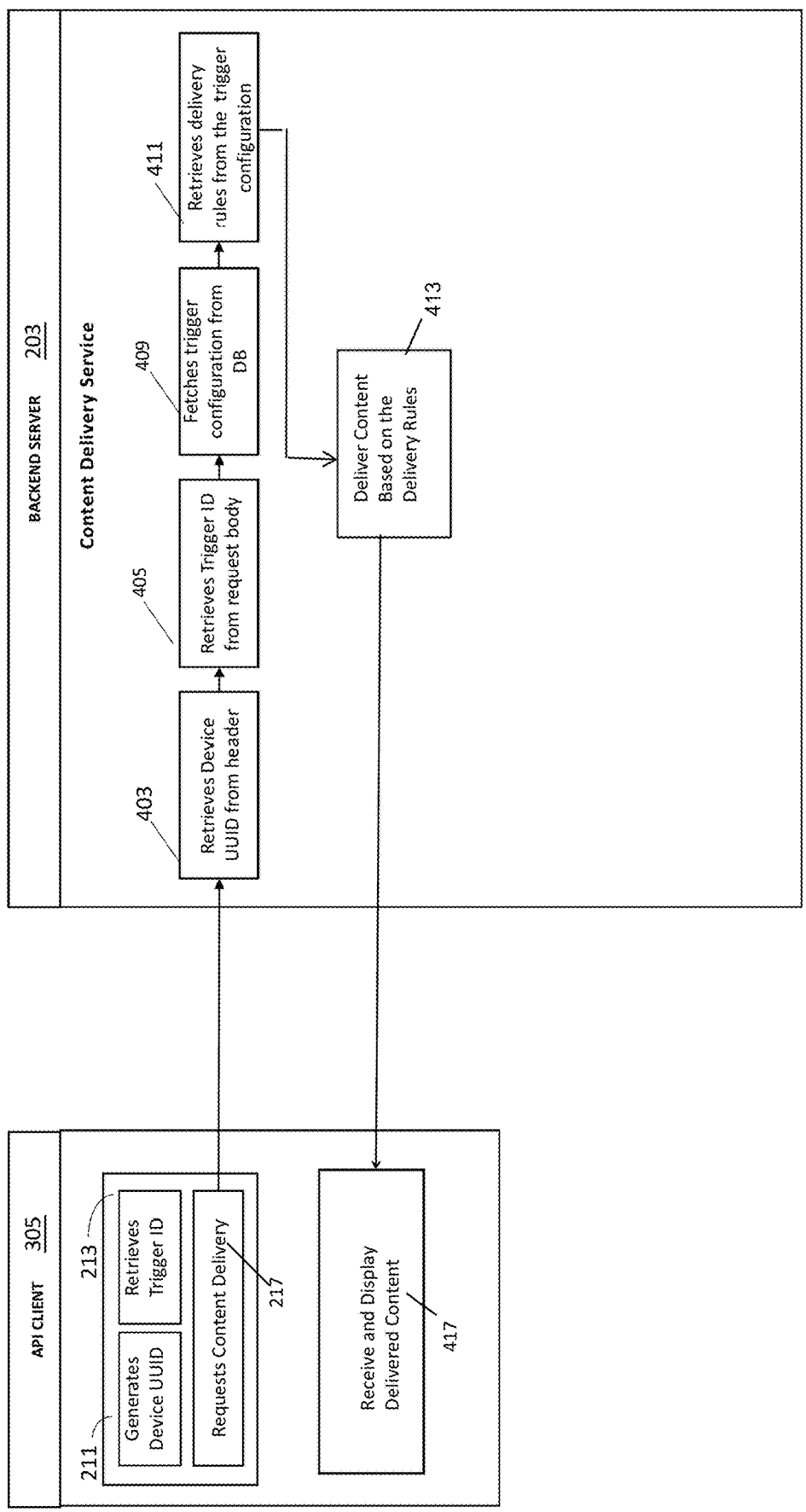
FIG. 4 is a detailed block diagram showing the process flow when an SQR code is scanned.

As shown in FIG. 4, which is a more detailed process flow of that shown in FIG. 2, API client 305 after the admin/user device scans the SQR code, it generates 211 the UUID and retrieves 213 the trigger ID from the scanned SQR code. It then requests 217 content delivery using the UUID and trigger ID from the backend server 203. Backend server 203 retrieves 403 the device UUID and retrieves 405 the trigger ID from the request body also stores the device record using the UUID provided in a database and fetches 409 the trigger configuration from the database. The UUID is used by the backend server as described above with reference to FIG. 2 to identify the user device which generated it.

The fetched trigger configuration is the used to retrieve 411 delivery rules for the content to be delivered. These rules are then used to obtain and deliver 413 the content created by the admin user as explained with reference to FIG. 3 to API client 305 which receives and displays 417 the content on the admin/user device.

After scanning a QR code API client 305 retrieves 211 the trigger ID from the URL (decoded value). As noted above, the trigger ID is typically a URL encoded in the QR code. The trigger ID is retrieved from the URL obtained from the scanned QR code as follows. The native app or web browser looks for the key/value pair "trigger_id=[value]" within the decoded string, and stores the value in its local cache so that it can be used when requesting content from the backend server.

The backend server 203 retrieves 405 the trigger configuration, including the content sequence, and based on targeting and sequence parameters and determines which content item to send back to the API client. This is the information set up by the administrator user as described above with reference to FIG. 3 which is sent back to the API client. Part of the delivery configuration includes the setting of targets. These are parameters that determine which content should be delivered to the users that match such targets. In the case of content that is intended only for admin users, the admin device UUID is set as one of the targets. This way, when and admin user scans a legitimate SQR code using a previously registered and authenticated device, the content that is delivered is that which matches the device UUID of such device. The number of device UUIDs that can be setup is only limited by the computing resources provisioned for the (i.e., database storage space, processing speed, availably RAM memory, etc.)

As noted above, backend server 203 retrieves the device UUID from the header of the request. A typical request with its header looks like this:

Request Header:
    :authority: api.actv8technologies.com
    :method: POST
    :path: /qrcode/422/catch?client_id=1
    :scheme: https
    accept: application/json, text/plain, */*
    accept-encoding: gzip, deflate, br
    accept-language: en-US,en;q=0.9
    cache-control: no-cache
    content-length: 2
    content-type: application/json;charset=UTF-8
    origin: https://catch.actv8technologies.com
    pragma: no-cache
    referer: https://catch.actv8technologies.com/
    sec-fetch-dest: empty
    sec-fetch-mode: cors
    sec-fetch-site: same-site
    user-agent: Mozilla/5.0 (iPhone; CPU iPhone OS 13_2_3 like Mac OS X) AppleWebKit/605.1.15 (KHTML, like Gecko) Version/13.0.3 Mobile/15E148 Safari/604.1
    x-api-key: 2376f984b8ccea1b0ef212797e3e3f21fa4024d7
    x-api-version: 4.4
    x-device-uuid: SZLzKtEPDsgBcJx9LwKL Request URL:
    https://api.actv8technologies.com/qrcode/422/catch?client_id=1

The specifics of the Request Header and Request URL are not important for an understanding of the invention—that is, the manner in which this type of information is generated and used is well known to persons having ordinary skill in the art.

In this manner, by using a static QR code which only contains a URL or app to be launched, and providing an API client and backend server as described herein, different content can be provided based on a variety of parameters as described herein. Such different content is determined such that a pre-registered UUID is used to provide unique content for use by an administrator to verify that a scanned QR code is genuine.

By way of example, in the case of using a QR code in a bank so that bank customers can scan the QR code and get information about any special promotions being offered by the bank, as one example, the overall flow would be as follows.

An admin user (i.e. a bank manager) uses his or her credentials to log into the content management system (CMS) of the bank. Upon successful authentication, the admin user proceeds to setup the "campaign", trigger and content. However, at this point the admin user does not have the UUIDs of devices intended for admin access.

Before saving the campaign configuration, the CMS system generates an "administration" sqr code. This "administration" SQR code is set up on a password protected URL/website address. This password protected website is intended to be accessed with a password by the bank manager with his or her computer (not mobile device) at the bank.

The admin user/bank manager accesses the URL with his/her password, opens the corresponding web page on his or her bank computer (not mobile phone) and sees the SQR code on the computer monitor.

The bank manager then takes our his/her mobile phone, and scans the SQR code that's on the bank computer monitor). Now that the bank manager has scanned the SQR code that is on the computer screen with his/her mobile phone, the device UUID is generated and automatically added to the campaign as a "whitelisted" device.

The admin user/bank manager can then add the device UUID as a target to the trigger configuration so that content only intended for the admin user/bank manager is delivered when accessed from the registered device.

Afterwards, when the admin user/bank manager scans the SQR code (the same intended for non admin users) from the whitelisted device, the backend is able to identify the registered UUID and serve the content for the admin user/bank manager.

The invention is implemented as a system and method using the various hardware elements described above with appropriate programming of the sequential configuration, trigger settings, backend server, and API client to provide the described functionality. Each of these elements uses a processor, storage and programming to supplement the generic functionality of these devices to produce functionality not currently available. The specifics of the processors and storage elements utilized are well known to persons skilled in the art, and such details are not needed for a full understanding of the invention. However, providing SQR code functionality on a mobile or other device which operates in conjunction with triggering mechanisms based on desired sequential configurations provides marketing and other advantages not currently available using prior art techniques. Furthermore, the ability to serve specific content to admin users improves the security of the system implementing it since it provides a mechanism to verify that the QR code asset has not been tampered with and therefore the content is not compromised.

Although the invention has been described using various examples and detailed descriptions, the invention is not intended to be limited by the specific examples and descriptions provided, but rather is limited only by the following claims.

The invention claimed is:

1. A method for delivery of predetermined administrator user content triggered after scanning a sequential Quick Response (QR) code with a device comprising:
    a) retrieving a Universal Unique Identifier (UUID) from the device based on a request received from the device;
    b) retrieving a trigger identifier (ID) from the device based on the request received from the device;
    c) fetching a previously created trigger configuration for delivering administrator user content to an administrator user which is stored by a server;
    d) obtaining a delivery setting from the fetched trigger configuration;
    e) selectively delivering content based on target matches with the fetched trigger configuration, wherein said delivered content is said predetermined administrator user content only if said retrieved UUID matches a previously stored UUID for said device.

2. The method defined by claim 1 wherein the administrator user content stored by the server includes delivery settings and content.

3. A method for obtaining predetermined administrator user content for use by a device from a server comprising:
    (a) sending to said server a Universal Unique Identifier (UUID), and a URL for said server to store a device record for said device;
    (b) retrieving a trigger identifier (ID) from said URL;
    (c) requesting content from said server by sending said trigger ID to said server;

(d) if said UUID and trigger ID match a previously stored UUID and trigger ID, receiving said predetermined administrator user content from said server and rendering said content on a display of said device.

4. A system for sequential delivery of predetermined administrator user content after scanning a sequential Quick Response (QR) code with a device comprising:
   a) a server configured to retrieve a Universal Unique Identifier (UUID) from the device based on a request received from the device;
   b) the server configured to retrieve a trigger identifier (ID) from the device based on the request received from the device;
   c) the server configured to fetch a previously created trigger configuration for delivering administrator user content to an administrator user which is stored by the server;
   d) the server configured to obtain a delivery setting from the fetched trigger configuration;
   e) the server configured to deliver the predetermined administrator user content to the device based on target matches with the fetched trigger configuration.

5. The method defined by claim 4 wherein the administrator user content stored by the server includes delivery settings and content.

* * * * *